United States Patent [19]
Zajac, Jr. et al.

[11] Patent Number: 5,714,279
[45] Date of Patent: Feb. 3, 1998

[54] NON-AQUEOUS LITHIUM CELLS

[75] Inventors: William V. Zajac, Jr., New York, N.Y.; Frank F. Bis, Mt. Airy; Frank C. DeBold, Rockville, both of Md.; Leonard A. Kowalchik, Union Hall, Va.; James A. Barnes, College Park, Md.

[73] Assignee: The United States of America as represented by the Secretary of the Navy, Washington, D.C.

[21] Appl. No.: 427,219

[22] Filed: Oct. 24, 1989

[51] Int. Cl.$^6$ ............................................ H01M 4/58
[52] U.S. Cl. ........................ 429/194; 429/207; 429/218
[58] Field of Search ...................................... 429/194, 207, 429/218; 428/408

[56] References Cited

U.S. PATENT DOCUMENTS

| | | |
|---|---|---|
| 4,865,931 | 9/1989 | McCullough, Jr. et al. ............ 429/194 |
| 4,945,014 | 7/1990 | Miyabayashi et al. .............. 429/194 X |
| 4,959,281 | 9/1990 | Nishi et al. ............................... 492/194 |

*Primary Examiner*—Peter A. Nelson
*Attorney, Agent, or Firm*—John Forrest; Roger D. Johnson

[57] ABSTRACT

The high discharge rate performance of a non-aqueous lithium electrochemical cell is improved by dispersing a portion of the lithium conducting salt of the electrolyte uniformly throughout the carbon current collector of the cathode in the form of microcrystals. Upon contact, the electrolyte solubilizes the lithium salt from the carbon current collector, increasing the surface area and thus the efficiency of the carbon current collector.

17 Claims, 3 Drawing Sheets

NON-AQUEOUS LITHIUM CELLS

BACKGROUND OF THE INVENTION

This invention relates to electrochemical cells and especially to high-energy, liquid cathode, non-aqueous lithium electrochemical cells.

Since the 1950's a great deal of research has been done to raise the specific energy of batteries. Higher energy chemicals were employed for the electrode material and of course much more stable electrolytes had to be found to withstand these strongly oxidizing and reducing chemicals. The relatively easily decomposed water of aqueous batteries was replaced by inert, aprotic solvents both organic and inorganic. Suitable electrolytes were identified combining sufficient conductance and electrochemical stability. Because of its low equivalent weight, strong reducing power, relatively high melting point and good rate capability, lithium emerged as the favorite anode material and was coupled with a variety of solid and liquid oxidants. For example, Li/SO$_2$ and Li/SOCl$_2$ liquid-cathode batteries combine both high specific energy and power. Compared with the aqueous batteries, almost an order of magnitude increase in specific energy was achieved together with superior storability, constancy of voltage, and low temperature operation.

In all high rate discharge applications of the non-aqueous high energy lithium cell, the carbon current collector becomes the limiting factor because reaction byproducts plug the surface porosity preventing further ionic penetration. At high rates of discharge, ionic mobility can have a bottlenecking effect at the surface of the carbon cathode leading to cathode plugging or blocking.

SUMMARY OF THE INVENTION

Accordingly, an object of this invention is to increase the efficiency of non-aqueous high energy lithium batteries.

Another object of this invention is to provide improved carbon, liquid-cathode structures for non-aqueous high energy lithium batteries.

A further object of this invention is to provide a method of extending the life of carbon electrodes in non-aqueous high energy lithium batteries when discharged at high rates.

These and other objects of this invention are accomplished by providing:

a carbon current collector formed by pressing carbon powder wherein from more than zero to abut 4.0 weight percent of an inorganic lithium salt in the form of microcrystals is uniformly distributed throughout the carbon. The carbon current collector can be used in lithium electrochemical cells wherein the inorganic lithium salt in the carbon current collector is a portion of the inorganic lithium salt of the electrolyte.

DETAILED DESCRIPTION OF THE PREFERRED EMBODIMENT

Figure 1:
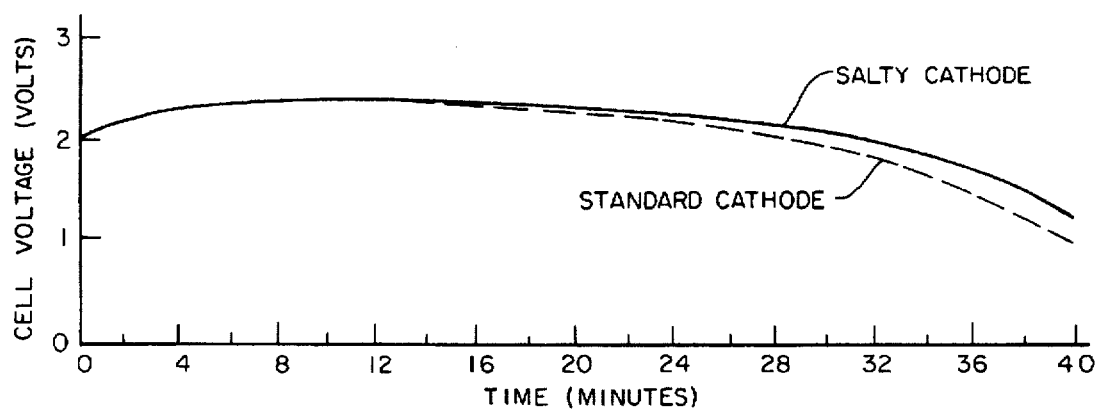
FIGS. 1 through 9 are discharge curves produced in tests comparing cells made according to this invention against standard cells.

The present invention provides a means for improving the high rate discharge capacity and performance of non-aqueous lithium batteries. These batteries comprise: (1) a lithium anode, (2) a carbon cathode current collector, and (3) an electrolyte comprising (a) non-aqueous solvent cathode depolarizer, and (b) an inorganic lithium salt as a current carrying solute. Sometimes a cosolvent is used to improve the solubility of the lithium salt in the solvent depolarizer. The solvent depolarizer is reduced at the carbon surface of the cathode current collector during discharge of the cell. At high rates of discharge, reaction byproducts plug the surface porosity of the carbon current collector preventing further ionic penetration. The capacity and efficiency of the cell is greatly reduced below its theoretical value. In this invention, a portion of the lithium salt is dispersed throughout the carbon in the current collector in the form of small crystals. The electrolyte penetrates the carbon current collector and solubilizes the salt out, leaving behind vacant sites available for reduction of solid depolarizer. This increases the carbon surface area and thus the capacity and performance of the battery.

Generally, any soluble substance may be added to the carbon collector provided that it does not interfere with the operation of the battery. Preferably, however, the soluble substance that should be used is the electrolyte salt. This guarantees that the substance will not interfere with the operation of the battery. Moreover, because the salt will be solubilized from the carbon cathode into the electrolyte, a coresponding amount may be left out of the electrolyte. Examples of suitable inorganic lithium salts include lithium bromide (LiBr), lithium chloride (LiCl), lithium perchlorate (LiClO$_4$), lithium tetrachloroborate (LiBCl$_4$), lithium tetrafluoroborate (LiBF$_4$), lithium tetrachloroaluminate (LiAlCl$_4$), lithium tetrafluoroaluminate (LiAlF$_4$), lithium tetrachlorogalliate (LiGaCl$_4$), lithium hexafluoroarsenate (LiAsF$_6$), lithium hexafluorophosphate (LiPF$_6$), lithium hexafluoroantimonate (LiSbF$_6$), lithium hexachloroantimonate (LiSbCl$_6$), dilithium hexachlorostanate (Li$_2$SnCl$_6$), dilithium hexachlorozirconate (Li$_2$ZrCl$_6$), dilithium hexachlorotitinate (Li$_2$TiCl$_6$), or mixture of these salts. Preferred salts are LiBr (for Li/SO$_2$ cells) and LiAlCl$_4$ (for Li/SOCl$_2$ and Li/SO$_2$Cl$_2$ cells). In general, the method of this invention may be applied to any non-aqueous lithium battery by initially putting a portion of the inorganic lithium salt solute of the electrolyte into the carbon with the remainder being in the electrolyte. When the electrolyte comes into contact with and penetrates the carbon current collector, the salt is solubilized out. This raises the solute concentration of the electrolyte to the desired level and increases the surface area of the carbon in the cathode current collector.

The amount of the lithium salt which is incorporated into the carbon current collector is limited by several factors. Broadly, the amount of salt is limited by the requirement that the current collector be mechanically strong and a good current conductor after the salt has been solubilized out. Preferred limits are determined by the amount of lithium electrolyte salt used in the cell and the activation time requirements for the cell. If substantially all of the salt is in the electrolyte with only a small portion in the carbon current collector, the cell will be ready to operate upon the addition of the electrolyte. At the other extreme, if high percentages of the lithium electrolyte salt is in the carbon current collector, substantial time will be required for the electrolyte to solubilize out sufficient salt for the cell to operate efficiently. From more than zero to 4.0, preferably from 0.1 to 1.5, and more preferably from 0.2 to 1.0 weight percent of the carbon cathode current collector will be the inorganic lithium salt.

The carbon cathode collectors are prepared from carbon powder (for example, Shawinigan acetylene black) by conventional wet or dry processes. Usually, a binder such as Teflon (4–6 weight percent) is added to the carbon powder.

For this invention, the conventional processes are modified by mixing the desired amount of the inorganic lithium salt into the carbon powder before it is pressed and shaped to form the current collector. The mixing may be done by adding the dry carbon powder and inorganic lithium salt to a ball mill and then mixing until the salt has been reduced to a fine powder of microcrystals. This usually takes less than an hour. The mixture may then be used in a conventional dry or wet process.

If a wet process is used and the inorganic lithium salt is sufficiently soluble in the wetting agent, the ball mill mixing step may be omitted. Later when the carbon current collector is dried in a conventional manner, the inorganic lithium salt crystallizes out as microcrystals through out the carbon structure.

The non-aqueous lithium batteries which may be improved by the present invention may contain fluid oxyhalides, non-metallic oxides or non-metallic halides as the solvent cathode depolarizers. For instance, phosphorous oxychloride ($POCl_3$), selenium oxychloride ($SeOCl_2$), sulfur dioxide ($SO_2$), sulfur trioxide ($SO_3$), vanadium oxytrichloride ($VOCl_3$), chromyl chloride ($CrO_2Cl_2$), thionyl chloride ($SOCl_2$), sulfuryl chloride ($SO_2Cl_2$), nitryl chloride ($NO_2Cl$), nitrosyl chloride ($NOCl$), nitrogen dioxide ($NO_2$), or mixtures thereof may be used as the solvent cathode depolarizer. Preferably the solvent cathode depolarizer would be $SO_2$, $SOCl_2$, or $SO_2Cl_2$.

The general nature of the invention having been set forth, the following examples are presented as specific illustrations thereof. It will be understood that the invention is not limited to these specific examples, but is susceptible to various modifications that will be recognized by one of ordinary skill in the art.

The cells tested were manufactured by Honeywell Corp. against Honeywell's 9Ah, G3091B9 design (cylindrical shape and near "D" size). The cells comprised: (1) a lithium anode, (2) a cathode current collected formed by wet pressing carbon black with a teflon binder, and (3) an electrolyte comprising 7 percent LiBr in a solvent mixture of sulfur dioxide ($SO_2$) as a polarizer solvent and acetyl cyanate ($CH_3C$ N) as a cosolvent. The cathodes of 11 cells in the experimental group of cells were modified as requested by R. F. Bis of the Naval Surface Warfare Center, White Oak, Md. The cathodes of those cells contained 2000 ppm (parts per million by weight) of lithium bromide (LiBr). Those 11 cells were called salty cathode cells. A control group of 11 Honeywell standard G3091B9 were prepared for comparison testing and were designated standard cells. The only difference between the salty cathode cells and the standard cells was the 2000 ppm of LiBr in the carbon material of the cathode current collector.

A first method of incorporating LiBr into carbon cathodes is as follows: LiBr powder is dissolved in water to make a dilute solution. This solution is mixed with the Teflon dispersion and carbon black to make a paste. The paste is dried and rolled onto a nickel screen. The electrode formed is then dried and cut into desired shapes for use in cells. This method has been used to prepare salty cathodes but not the ones used in the present examples.

Instead, a second method was used to prepare the salty cathodes used in the tests which follow. In a dry room, reagent grade LiBr powder was incorporated into the carbon cathodes by blending the LiBr, a Teflon dispersion (polytetrafluoroethylene: PTFE) as a binder, and carbon black (Shawinigan acetylene black) as a paste which was dried and rolled onto a nickel screen. The electrode was dried, cut into the desired shapes, and then placed into standard test cells to form the salty cathode cells.

A test regime, specified by R. F. Bis, was conducted on both the salty cathode cells and the standard cathode cells. All of the cells were visually inspected and weighed, the open circuit voltage taken, and AC resistance (1,000 Hz) measurements were made. Table 1 presents a comparison of the average values for the 11 salty cathode cells versus the 11 standard cells for the open circuit voltage (OCV), the weight, and the AC resistance (1,000 Hz).

TABLE 1

| MEASUREMENT AVERAGES | | |
|---|---|---|
| MEASUREMENT | SALTY CATHODE | STANDARD CATHODE |
| OCV | 2.967 | 2.976 |
| WEIGHT (g) | 98.499 | 98.291 |
| ACR(1000 Hz) | .514 | .315 |

Next pulsing tests (polarization tests) were performed on a total of 8 cells, 4 salty cathode and 4 standard cathode. Two of the salty and two of the standard cells were pulsed at resistances of 1000, 100, 10, and 1 ohm, while the remaining two salty and two standard cells were reverse pulsed at resistances of 1, 10, 100 and 1000 ohms. The pulsing sequence was 20 seconds on and 20 seconds off at each resistance. ACR (AC impedance at 1000 Hz) was measured immediately before and after pulsing each cell. A strip chart recorder, paralleled with a digital voltmeter was used to measure and record voltage drop and voltage recovery. These pulsing tests were repeated again on the same cells in the same manner after a two week stand at room temperature. The pulsing test results showed the standard cathode cells doing slightly better overall with less voltage drop. Table 2 presences a comparison of AC resistant (1000 Hz) before and after pulsing for the salty cathode and the standard cathode cells.

TABLE 2

| ACR AVERAGES BEFORE AND AFTER PULSING | | |
|---|---|---|
| CATHODE | ACR BEFORE | ACR AFTER |
| PULSED AT 1000, 100, 10, 1 OHM (20 sec pulses) | | |
| SALTY CATHODE | .482 | .341 |
| STANDARD CATHODE | .301 | .194 |
| REVERSE PULSED AT 1, 10, 100, 1000 OHMS (20 sec. pulses) | | |
| SALTY CATHODE | .539 | .345 |
| STANDARD CATHODE | .294 | .229 |

Forced discharge tests were performed next. These tests were conducted in a steel walled, explosive loading enclosure with floor space of about 8 feet by 8 feet. A powerful, built in fan was used to clear gasses and odors from the test site.

Voltage, current, and temperature were monitored throughout each test using a Fluke Data Logger. The cells were discharged using a D.C. power supply set for constant current and unlimited, floating voltage.

The forced discharge tests were performed individually on a total of 18 cells, 9 salty cathode, and 9 standard cathode. All of the these cells were driven into voltage reversal for 150% of cell capacity during discharge. Those cells that were discharged at low temperatures were soaked for 24 hours in the cold box to ensure uniform temperature throughout the cell.

Table 3 identifies the test conditions.

TABLE 3

DISCHARGE TEST CONDITIONS

| NO. OF CELLS | | DISCHARGE | | PREVIOUSLY | PREVIOUSLY |
|---|---|---|---|---|---|
| SALTY CATH. | STANDARD CATH. | RATE (AMPS) | TEMPERATURE | SUBJECTED TO PULSING | SUBJECTED TO REVERSE PULSING |
| 2 | 2 | 8 | AMBIENT | NO | NO |
| 1 | 1 | 8 | AMBIENT | YES | NO |
| 1 | 1 | 8 | AMBIENT | NO | YES |
| 1 | 1 | 16 | AMBIENT | NO | NO |
| 1 | 1 | 16 | AMBIENT | YES | NO |
| 1 | 1 | 16 | AMBIENT | NO | YES |
| 1 | 1 | 4 | −3° C. | NO | NO |
| 1 | 1 | 2 | 0° C. | NO | NO |

Figure 2:
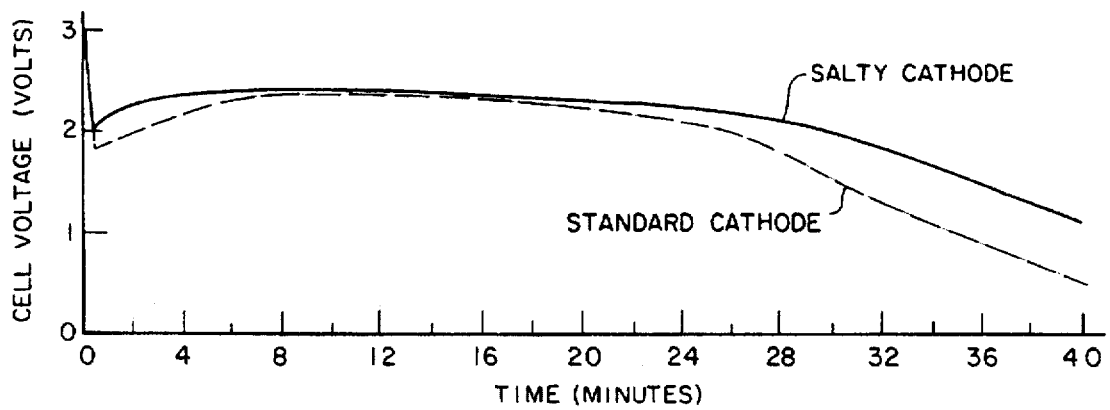
Figure 3:
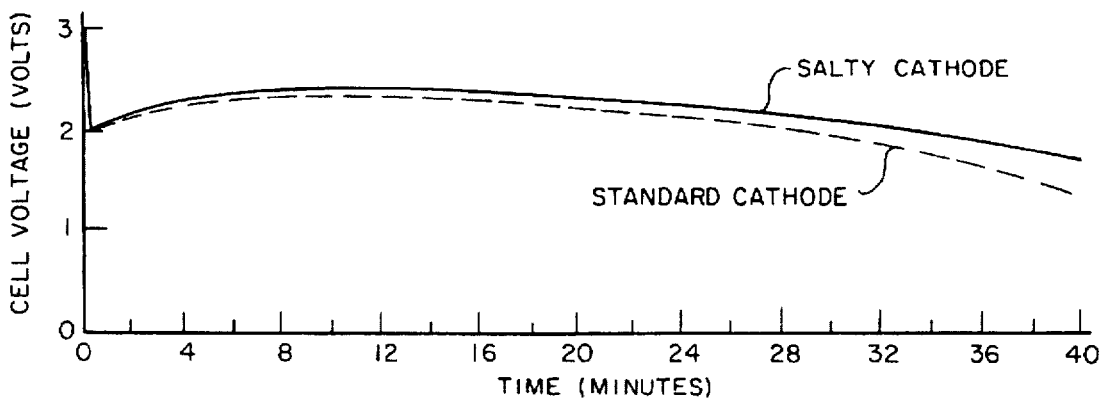
Figure 4:
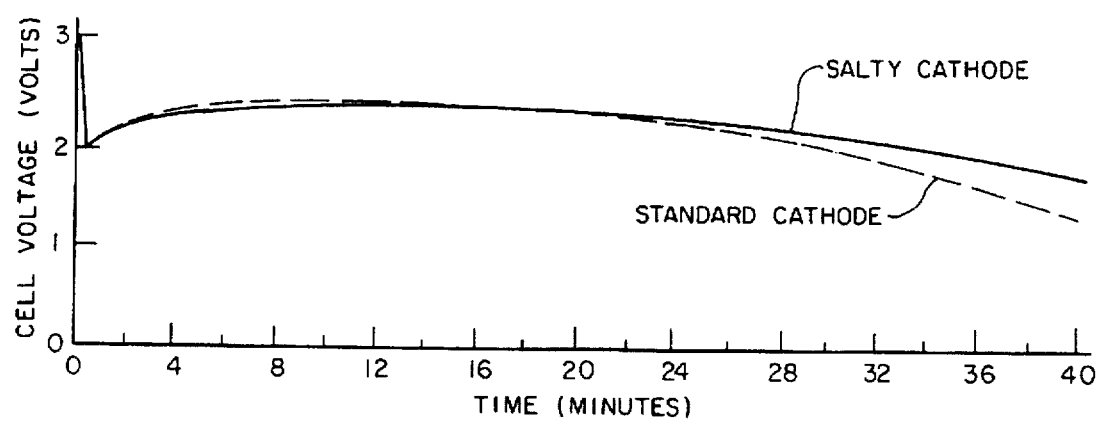
Figure 5:
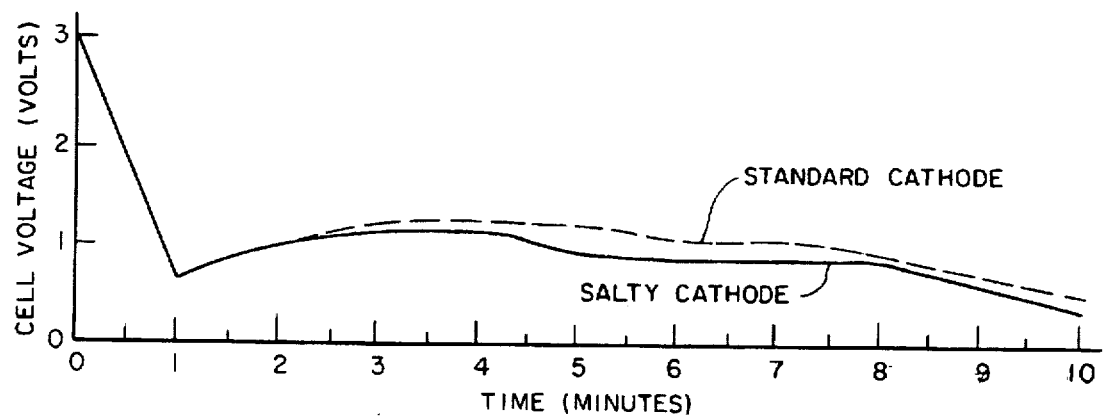
Figure 6:
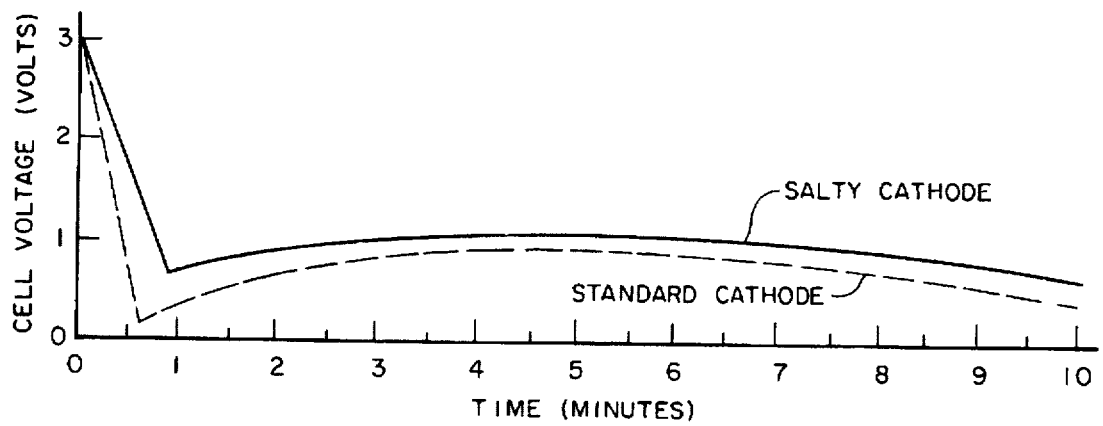
Figure 7:
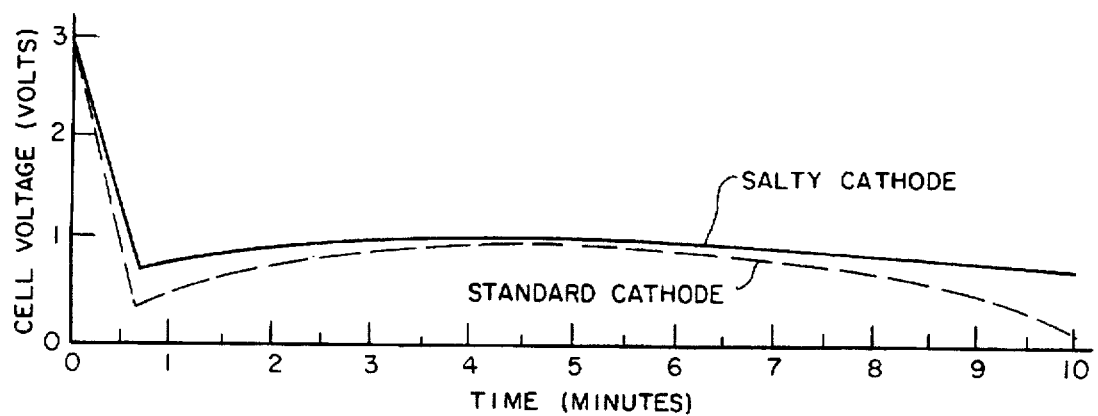
Figure 8:
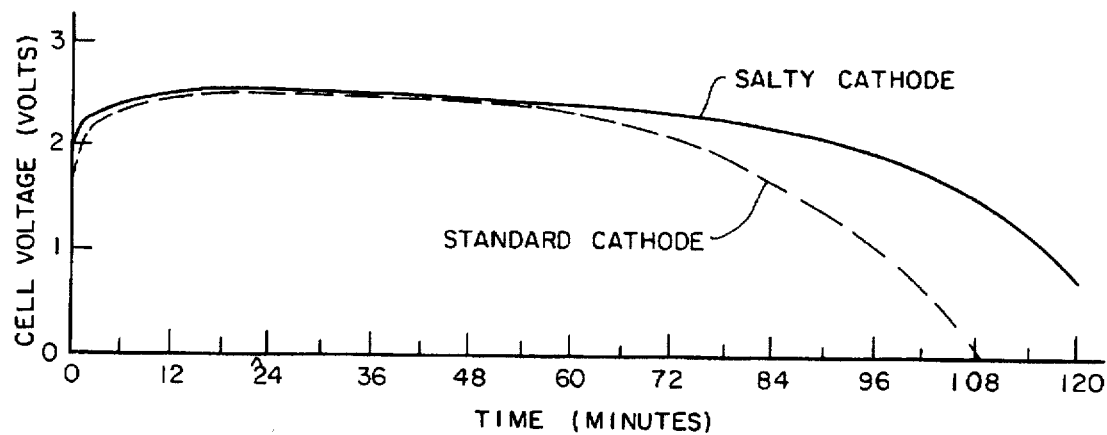
Figure 9:
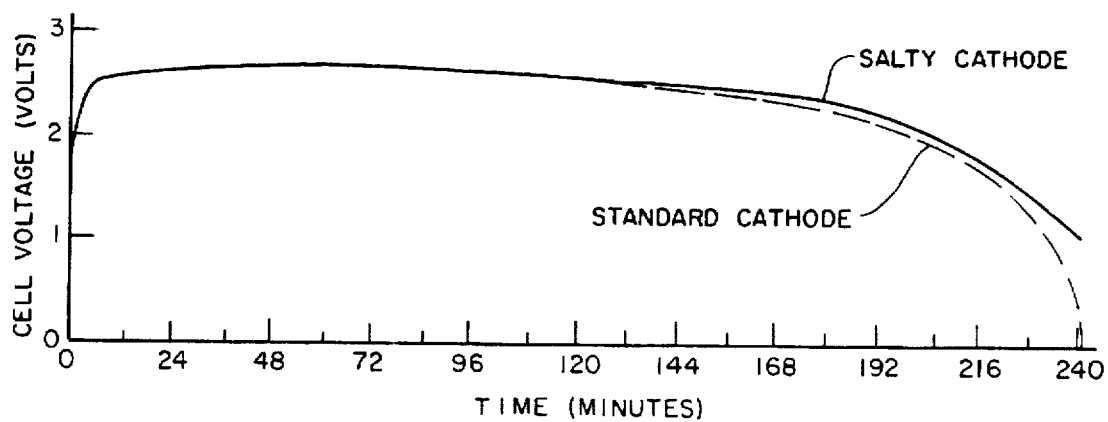

The discharge data shows the salty cathode cells significantly improved in ampere hour capacity over the standard cathode cathode cells. Table 4 assigns the percent of improvement in the ampere hour capacity, and table 5 gives the actual ampere hours comparison of both types of cells. FIGS. 1 through 9 are the discharge curves comparing salty and standard cathode cells.

TABLE 4

PERCENT OF IMPROVEMENT USING THE SALTY CATHODE

| FIG. NO. | % OF IMPROVEMENT (2 VOLT CUTOFF) |
|---|---|
| 1 | 9.6 |
| 2 | 17.6 |
| 3 | 17.3 |
| 4 | 11.5 |
| 5 | −9.7* |
| 6 | 18.5* |
| 7 | 28.4* |
| 8 | 26.7 |
| 9 | 1.5 |

*Cutoff here was .5 volt because of rapid drop through 2 volts when the switch was closed.

Although lithium battery safety was not a consideration in this test program, both the salty and the standard cathode cells were well behaved when forced into voltage reversal.

All of the cells vented and no explosions occurred. One of the cells produced a little flame at venting, otherwise the cell ventings were consistent with mild ventings and an average temperature of 106° C.

Short circuit tests were the last series of tests performed in order to complete the test regime. A millivolt strip chart recorder was added to the previously described instrumentation in order to measure current accurately. The power supply was of course removed from the circuit. Short circuit tests were conducted on a total of 4 cells, 2 salty cathode, and 2 standard cathode. The first two tests (one cell salty; one cell standard) were run with a required, pre-set circuit resistance of 0.25 ohms. To accomplish this, a variable resistor was made up using a short piece of nichrome wire. The second two tests (again one cell salty; the other cell standard) were run as a "best" short circuit, achieved by using short, heavy gage current carrying leads. All of these tests were run sufficiently long to remove all of the capacity from the cells. The results of the short circuit tests are summarized in table 6.

TABLE 5

AMPERE HOUR CAPACITY COMPARISON

| | DISCHARGE | LiBr Salted Cathode (Ampere Hours) | | STANDARD CATHODE (Ampere Hours) | | | |
|---|---|---|---|---|---|---|---|
| EXAMPLE | RATE (AMPERES) | 2 VOLT CUTOFF | .5 VOLT CUTOFF | 2 VOLT CUTOFF | .5 VOLT CUTOFF | TEMPERATURE (DEGREES "C") | FIG. |
| 1 | 8 | 4.12 | 6.09 | 3.76 | 5.57 | 20 | 1 |
| 2 | 8 | 3.82 | 5.78 | 3.25 | 5.21 | 22 | 2 |
| 3 | 8* | 4.60 | 6.78 | 3.92 | 5.81 | 21 | 3 |
| 4 | 8** | 4.47 | 6.32 | 4.01 | 5.94 | 19 | 4 |
| 5 | 16 | 0 | 2.41 | 0 | 2.67 | 15 | 5 |
| 6 | 16* | 0 | 2.88 | 0 | 2.43 | 16 | 6 |
| 7 | 16** | 0 | 3.03 | 0 | 2.36 | 17 | 7 |
| 8 | 4 | 6.46 | 8.23 | 5.10 | 6.90 | −3 | 8 |
| 9 | 2 | 6.98 | 8.20 | 6.88 | 7.97 | −2 | 9 |

*Previously pulsed at 1000, 100, 10 and 1 ohm
**Previously pulsed at 1, 10, 100, and 1000 ohms

TABLE 6

SHORT CIRCUIT: INITIAL CURRENT DRAWN WHEN SWITCH WAS CLOSED

| TYPE OF | CURRENT IN AMPERES | |
|---|---|---|
| SHORT CIRCUIT | SALTY CATHODE | STANDARD CATHODE |
| Short circuit with circuit resistance of .25 | 7.08 | 7.80 |
| "Best" short circuit using short heavy gage wires | 27.78 | 16.32 |

Note that LiBr comprises only 0.2 percent by weight of the carbon cathode collectors in the salty cathode cells. This is an insignificant amount of LiBr in comparison to the LiBr present in the $SO_2$ electrolyte.

Obviously, numerous modifications and variations of the present invention are possible in light of the above teachings. It is therefore to be understood that, within the scope of the appended claims, the invention may be practiced otherwise than as specifically described.

What is claimed is:

1. A carbon current collector formed by pressing carbon powder wherein from more than zero to abut 4.0 weight percent of an inorganic lithium salt in the form of microcrystals is uniformly distributed throughout the carbon.

2. The carbon current collector of claim 1 which contains from 0.1 to 1.5 weight percent of the inorganic lithium salt.

3. The carbon current collector of claims 2 which contains from 0.2 to 1.0 weight percent of the inorganic lithium salt.

4. The carbon current collector of claim 1 wherein the inorganic lithium salt is selected from the group consisting of LiBr, LiCl, $LiClO_4$, $LiBCl_4$, $LiBrF_4$, $LiAlCl_4$, $LiAlF_4$, $LiAsF_6$, $LiPF_6$, $LiSbF_6$, $LiSbCl_6$, $Li_2SnCl_6$, $Li_2ZrCl_6$, $Li_2TiCl_6$, and mixtures thereof.

5. The carbon current collector of claim 4 wherein the inorganic lithium salt is selected from the group consisting of LiBr, $LiAlCl_4$, and mixtures thereof.

6. The carbon current collector of claim 5 wherein the inorganic lithium salt is LiBr.

7. In a non-aqueous electrochemical cell comprising
   (1) a lithium electrode;
   (2) a non-aqueous electrolyte comprising
      (a) an inorganic lithium electrolyte salt and
      (b) a solvent cathode depolarizer selected from the group consisting of fluid oxyhalides, fluid non-metallic oxides, fluid non-metallic halides, and mixtures thereof;
   (3) a carbon cathode current collector; and
   (4) a separator between the lithium anode and the carbon cathode current collector, the improvement comprising where prior to activation of the cell from more than zero to 4.0 weight percent of the carbon cathode current collector being the inorganic lithium electrolyte salt in the form of microcrystals which are distributed uniformly throughout the carbon cathode current collector, with the remainder of the inorganic lithium electrolyte salt being present in the electrolyte.

8. The improved non-aqueous electrochemical cell of claim 7 wherein the carbon cathode current collector contains from 0.1 to 1.5 weight percent of the inorganic lithium electrolyte salt.

9. The improved non-aqueous electrochemical cell of claim 8 wherein the carbon cathode current collector contains from 0.2 to 1.0 weight percent of the inorganic lithium electrolyte salt.

10. The improved non-aqueous chemical cell of claim 7, wherein the lithium electrolyte salt is selected from the group consisting of LiBr, LiCl, $LiClO_4$, $LiBCl_4$, $LiBrF_4$, $LiAlCl_4$, $LiAlF_4$, $LiAsF_6$, $LiPF_6$, $LiSbF_6$, $LiSbCl_6$, $Li_2SnCl_6$, $Li_2ZrCl_6$, $Li_2TiCl_6$, and mixtures thereof.

11. The improved non-aqueous chemical cell of claim 8 wherein the lithium electrolyte salt is selected from the group consisting of LiBr, $LiAlCl_4$, and mixtures thereof.

12. The improved non-aqueous chemical cell of claim 9 wherein the electrolyte salt is LiBr.

13. The improved non-aqueous electrochemical cell of claim 7 wherein the solvent cathode depolarizer is selected from the group consisting of $POCl_3$, $SeOCl_2$, $SO_2$, $SO_3$, $VOCl_3$, $CrO_2Cl_2$, $SOCl_2$, $SO_2Cl_2$, $NO_2Cl$, $NOCl$, $NO_2$, or mixtures thereof.

14. The improved non-aqueous electrochemical cell of claim 13 wherein the solvent cathode depolarizer is selected from the group consisting of $SO_2$, $SOCl_2$, or $SO_2Cl_2$.

15. The improved non-aqueous electrochemical cell of claim 14 wherein the inorganic lithium electrolyte salt is LiBr and the solvent cathode depolarizer is $SO_2$.

16. The improved non-aqueous electrochemical cell of claim 14 wherein the inorganic lithium electrolyte salt is $LiAlCl_4$ and the solvent cathode depolarizer is $SO_2Cl_2$.

17. The improved non-aqueous electrochemical cell of claim 14 wherein the inorganic lithium electrolyte salt is $LiAlCl_4$ and the solvent cathode depolarizer is $SOCl_2$.

* * * * *